TRANSISTOR SWITCHING RECTIFIER WITH CONTROLLED CONDUCTION

Filed Dec. 28, 1965 2 Sheets-Sheet 1

INVENTORS G. S. FLY
C. M. LESHE
BY R. B. Ardis
ATTORNEY

United States Patent Office 3,354,380
Patented Nov. 21, 1967

3,354,380
TRANSISTOR SWITCHING RECTIFIER WITH CONTROLLED CONDUCTION

Gale S. Fly and Charles M. Leshe, Winston-Salem, N.C., assignors to Bell Telephone Laboratories, Incorporated, New York, N.Y., a corporation of New York
Filed Dec. 28, 1965, Ser. No. 516,938
5 Claims. (Cl. 321—18)

This invention relates to rectifiers and, more specifically, to an improvement in the efficiency of rectifiers.

In a rectifier an alternating current waveform is applied to a load through a nonlinear device to convert the alternating current to direct current. The nonlinear device used in a rectifier as the rectifying element should, ideally, have unidirectional conduction characteristics with zero resistance in the forward conduction direction.

Semiconductor diodes, particularly silicon diodes with their excellent temperature and reliability characteristics, have been widely used as rectifying elements. Since a diode conducts only when the voltage applied to its anode is positive with respect to the voltage present at its cathode, such diode is substantially unidirectional. However, its resistance in the forward conduction direction is not zero. This inherent forward resistance with its associated power loss during conduction severely limits the rectifying efficiency of diodes, particularly in high current, low voltage rectifiers.

In an attempt to overcome this inherent power loss of semiconductor diode rectifiers, transistors, having a very low saturation voltage, are presently being used in some rectifier applications as the rectifying elements. A switching voltage, in phase with the input alternating current voltage, is being applied to the base-emitter path to saturate the respective transistor, thereby reducing the effective series resistance and substantially decreasing the power loss in the transistor.

Most rectifiers in order to provide for a substantially constant direct current output voltage, supply power to a load including a filter. The filter stores energy and, therefore, tends to maintain the output voltage essentially constant. In a diode rectifier, as soon as the alternating current input voltage decreases below the stored filter voltage, the diode is back biased, thereby preventing the source from absorbing power from the load. When, however, a switched transistor is used as the rectifying element, the polarity sensitivity inherent to diodes is lost. That is, the transistor rectifier remains conductive even when the source voltage decreases below the stored filter voltage as long as the transistor is still forward biased. The filter consequently discharges back into the source and the source therefore absorbs power from the load as soon as the alternating current input voltage decreases below the stored filter voltage. These discharge effects particularly limit the efficiency of high current, low voltage rectifier circuits.

The primary object of the invention is to limit the conduction of a transistor switching rectifier to that portion of the operating cycle during which the source supplies power to the load.

A further object of the invention is to improve the operating efficiency of rectifiers employing transistors as rectifying elements.

To fulfill these objects, the invention utilizes together with a transistor rectifying element a bistable triggering circuit to switch the rectifier transistor between its high and low impedance modes. The bistable triggering circuit, however, is responsive to the emitter-collector voltage of the rectifier transistor, thereby switching the transistor into conduction only during that portion of each operating cycle during which the source supplies energy to the load.

More specifically, one embodiment of the invention comprises a typical rectifier circuit having an alternating current power source, a transistor as the rectifying element, a load which may have a power factor between zero and one, inclusively, and, in addition, a bistable triggering circuit and a transistor base control circuit. The output of the alternating current source is transformer coupled to the series combination of the the load and the emitter-collector path of the transistor. The bistable triggering circuit senses the emitter-collector voltage of the rectifier transistor to generate output pulses which are applied to the transistor base control circuit. The output of the base control circuit in turn is applied to and controls the conduction of the rectifier transistor.

The increase in rectifier efficiency is achieved through the controlled switching of the rectifier transistor as a function of the polarity of the emitter-collector voltage of the transistor. The polarity of the voltage across the emitter-collector junction changes at two points of each cycle of the alternating current input: (1) at the instant when the source starts to supply energy to the load, and (2) at the instant when the source starts to absorb energy from the load. The energy supply cycle commences when the alternating current input voltage exceeds the stored voltage in the load, whereas the energy absorption cycle begins at the instant, when during the transistor conduction cycle, the alternating current input voltage decreases below the stored voltage of the load. The bistable triggering circuit senses these polarity changes and generates a trigger pulse for each one of them.

In accordance with a feature of the invention, a first series of trigger pulses, each one of which is individually generated at the instant when the alternating current input voltage begins to exceed the stored energy of the load, activates the base control circuit to saturate the rectifier transistor. The source, therefore, commences to supply energy to the load through the rectifier transistor. Since the transistor is saturated, it presents a minimum impedance to current flow, thereby minimizing power loss in the transistor.

In accordance with another feature of the invention, a second series of trigger pulses, each one of which is individually generated at the instant when the source tends to absorb energy from the load, is employed in the gate control circuit to remove the forward bias from the rectifier transistor, causing the transistor to cease conduction. The rectifier transistor conducts, therefore, only during that portion of each operating cycle during which the source supplies energy to the load. The substantial elimination of losses in rectifying elements is therefore combined with the substantial elimination of power absorption by the source from the load to provide for a highly efficient transistor switching rectifier.

The above and other features of the invention will be more fully understood from the following detailed description considered in conjunction with the drawings in which.

Figure 1:
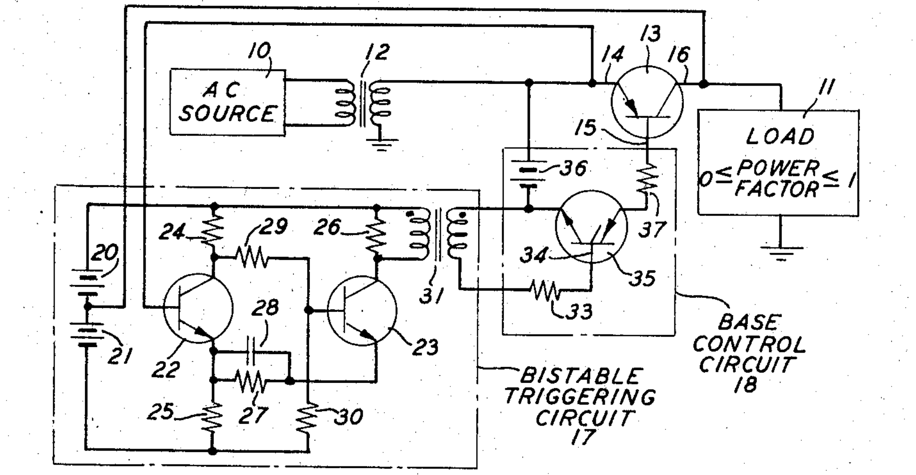
FIG. 1 is a schematic of one specific embodiment of the invention making use of a half-wave, single phase rectifier.

In FIG. 1 a rectifier is shown comprising alternating current source 10 coupled to load 11 through input transformer 12 and the emitter-collector path of transistor 13. Transistor 13 has an emitter electrode 14, a base electrode 15, and a collector electrode 16. Bistable triggering circuit 17, which receives its input from emitter electrode 14 and collector electrode 16, couples its output to base control circuit 18. The conduction of transistor 13 is finally controlled by the output of base control circuit 18 which is applied to emitter electrode 14 and base electrode 15.

Rectification is achieved by switching transistor 13 into saturation for specific portions of each operating cycle of the alternating current input waveform. The required switching of transistor 13 between its modes of low and high conductivity is performed by base control circuit 18. Base control circuit 18, on the other hand, is controlled by the output of bistable triggering circuit 17, which, in turn, generates its trigger output as a function of the emitter-collector voltage of transistor 13. The conduction of transistor 13 is thereby restricted to that portion of each operating cycle during which alternating current source 10 supplies power to load 11 .

Bistable triggering circuit 17 comprises voltage sources 20 and 21 and two transistor stages including transistors 22 and 23. Power is applied from serially connected voltage sources 20 and 21 to transistor 22 through load resistor 24 and common emitter resistor 25, and to transistor 23 through the parallel combination of damping resistor 26 and the primary winding of transformer 31, emitter resistor 27 bypassed by capacitor 28, as well as through common emitter resistor 25. Resistors 29 and 30 are serially connected between the collector of transistor 22 and the negative side of voltage source 21, and the base of transistor 23 is connected to the junction point of resistors 29 and 30. The input to the bistable triggering circuit is applied between the junction point of voltage sources 20 and 21 and the base electrode of transistor 22. Coupling transformer 31, having its primary winding connected across damping resistor 26, couples the output to base control circuit 18. Bistable triggering circuit 17 functions in the manner of a conventional Schmitt trigger circuit, but has improved hysteresis characteristics as described in the article by W. E. Zurbeck on a "Minimum-, Predictable-Hysteresis Schmitt Trigger," published in Electronic Equipment Engineering, pages 40–43 of the December 1963 issue.

Bistable triggering circuit 17 has two stable output states A and B, which are a function of its input voltage. In state A the voltage at the collector of transistor 23 is at a low potential, whereas in state B the collector voltage is at a high potential. Switching from state A to state B with a corresponding positive output pulse at the secondary winding of transformer 31 occurs when this input voltage crosses a first trigger point voltage. Switching from state B to state A with a corresponding negative pulse at the secondary winding of transformer 31, on the other hand, occurs when its input voltage crosses a following second trigger point voltage. Because of inherent hysteresis characteristics the first and second trigger points do not occur at identical voltages, but are determined by the specific circuit design of the bistable triggering circuit.

Figures 2A, 2B, 2C, 2D, 2E:
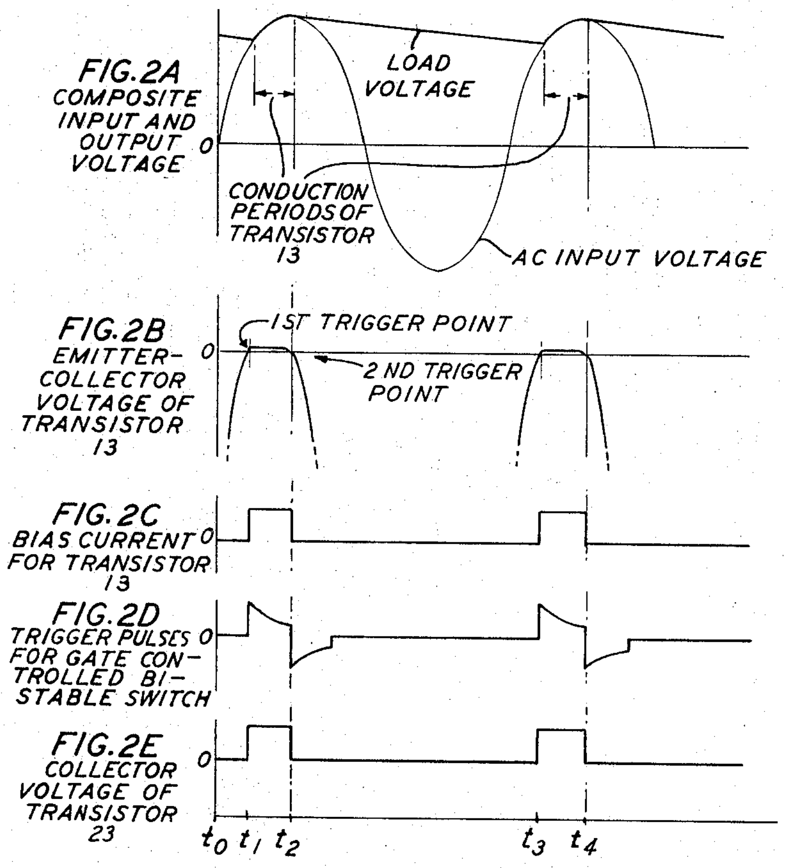
FIGS. 2A through 2E show waveforms illustrating the operation of the embodiment of FIG. 1 when supplying power to a load including a capacitor input filter.

The input to bistable triggering circuit 17 is the emitter-collector voltage $v_{ce}$ of transistor 13 which reflects the difference between the instantaneous alternating current input voltage $v_{ac}$ and the instantaneous stored voltage $v_0$ of the filter; i.e., $v_{ce}=v_{ac}-v_0$. This input connection is the only external direct current connection to bistable triggering circuit 17, making the circuit independent of all other external circuit conditions. Since all other circuit parameters of bistable triggering circuit 17 are fixed, the triggering of the circuit is an exclusive function of the emitter-collector voltage $v_{ce}$ of transistor 13. Bistable triggering circuit 17 is so designed as to switch from state A to state B when its input voltage crosses a first trigger point while going positive, i.e., when $v_{ce}=v_{ac}-v_0$ is positive and has reached such value as to make the bistable triggering circuit input voltage equal to the first trigger point voltage. Switching from state B back to state A occurs when its input voltage crosses a second following trigger point while going negative, i.e., when $v_{ce}=v_{ac}-v_0$ is less positive than the $v_{ce}$ of the first trigger point and has reached such value as to make the bistable triggering circuit input voltage equal to the second trigger point voltage. FIGS. 2A and 2B depict the alternating current input and the direct current output voltage waveforms and the emitter-collector voltage $v_{ce}$, respectively, illustrating the operation of the embodiment of FIG. 1.

When between time $t_0$ and $t_1$ the input voltage to bistable triggering circuit 17 is below the first trigger point, transistor 22 is nonconducting and transistor 23 is conducting. The voltage on the collector of transistor 23 is at a low potential as shown for time $t_0$ to $t_1$ of FIG. 2E; i.e., the bistable triggering circuit is in state A. At time $t_1$ the input voltage, i.e., $v_{ce}$, crosses the first trigger point; transistor 22 begins to conduct, turning off transistor 23 (i.e., transistor 23 is nonconducting), thereby switching the bistable triggering circuit into state B. The output voltage at the collector of transistor 23 therefore rises at time $t_1$ as shown in FIG. 2E.

This change in state of bistable triggering circuit 17 is coupled to base control circuit 18 via the secondary winding of transformer 31 in the form of a positive pulse as shown in FIG. 2D for time $t_1$. This positive pulse, in turn, is applied through resistor 33 to gate input 34 of gate controlled bistable switch 35 to turn it on. Gate controlled bistable switch 35 is a three terminal component which can be turned "off" as well as "on" from its gate input 34. A positive pulse of gate current will latch the switch into conduction, and a subsequent negative pulse will turn it "off" again. The gate turn-off switch of a type as described in Chapter 12, pages 219 through 234, of the General Electric SCR Manual, third edition, published in 1964 by the General Electric Company, can be used to perform the functions of gate controlled bistable switch 35. Forward bias current, as shown in FIG. 2C, is therefore applied from voltage source 36, through the conducting gate controlled bistable switch 35 and resistor 37 to the base-emitter junction of transistor 13. The forward bias so generated is sufficient to saturate transistor 13, thereby allowing alternating current source 10 to supply energy to load 11 with a minimum power loss in transistor 13. In certain applications voltage source 36 may not be required to forward bias transistor 13. The junction point of voltage source 36 and gate controlled bistable switch 35 is in that case directly connected to the ground terminal of the secondary winding of transformer 12. The voltage developed across the secondary winding of transformer 12 is thereby utilized to forward bias transistor 13 when gate controlled bistable switch 35 is turned on.

After the alternating current input voltage has passed through its peak positive voltage, it decreases towards zero voltage. The load voltage, however, because of energy storage in the filter or other reactive load component effects, tends to remain at a higher storage voltage level. Because of this storage effect and the simultaneous decrease in input voltage, the source would tend to absorb power from the load if the rectifier transistor were to remain forward biased during this part of the operating cycle.

The present invention senses the current reversal through and the resulting voltage change across transistor 13. When the source begins to absorb power from the load the current through transistor 13 reverses, providing for a change in $v_{ce}$ as shown in FIG. 2B for time $t_2$. Bistable triggering circuit 17 senses this change and switches from state B back to state A the instant this change in $v_{ce}$ causes the input voltage to cross the second trigger point. The resulting change in state of bistable triggering circuit 17 at time $t_2$ is illustrated in FIG. 2E, and the resulting negative pulse at the input to base control circuit 18 is shown in FIG. 2D. This negative pulse turns "off" gate controlled bistable switch 35, disconnecting voltage source 36 from transistor 13, thereby turning "off" transistor 13. As a result, the energy stored in the load is prevented from discharging back into the source.

The instant invention, therefore, considerably improves the operating efficiency of rectifier circuits by making it feasible to take advantage of the inherent low loss characteristics of saturated transistors without creating an undesirable power absorption by the source.

Figure 3:
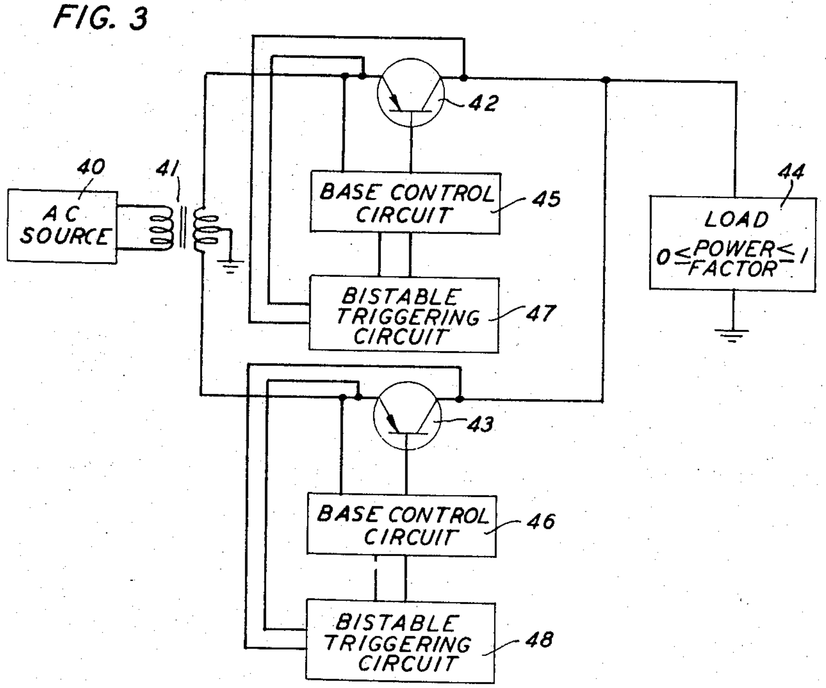
FIG. 3 is a simplified schematic of an embodiment of the invention using a full-wave, single phase rectifier.

FIG. 3 is a simplified schematic of an embodiment of the invention using a full-wave, single phase rectifier. The rectifier functions in the manner of a conventional full-wave rectifier. Alternating current source 40 supplies input power via transformer 41 through the emitter-collector paths of transistors 42 and 43, respectively, to load 44. Base control circuits 45, 46, and bistable triggering circuits 47 and 48 have their inputs connected across control circuit 18 and bistable triggering circuit 17, respectively, of the embodiment of FIG. 1. Bistable triggering circuits 47 and 48 have their inputs connected across the emitter-collector paths of transistors 42 and 43, respectively, to sense the respective emitter-collector voltage, and their outputs are connected to base control circuits 45 and 46, respectively. Base control circuits 45 and 46, in turn, have their outputs connected across the base emitter junction of transistors 42 and 43, respectively. Transistors 42 and 43 conduct during alternate half-cycles of the alternating current input waveform. Base control circuit 45 together with bistable triggering circuit 47, and base control circuit 46 together with bistable triggering circuit 48, control the conduction of transistors 42 and 43, respectively, during respective half-cycles. The conduction of transistors 42 and 43 is thereby limited to that portion of each half-cycle during which the source supplies energy through the respective transistor to load 44.

Figure 4:
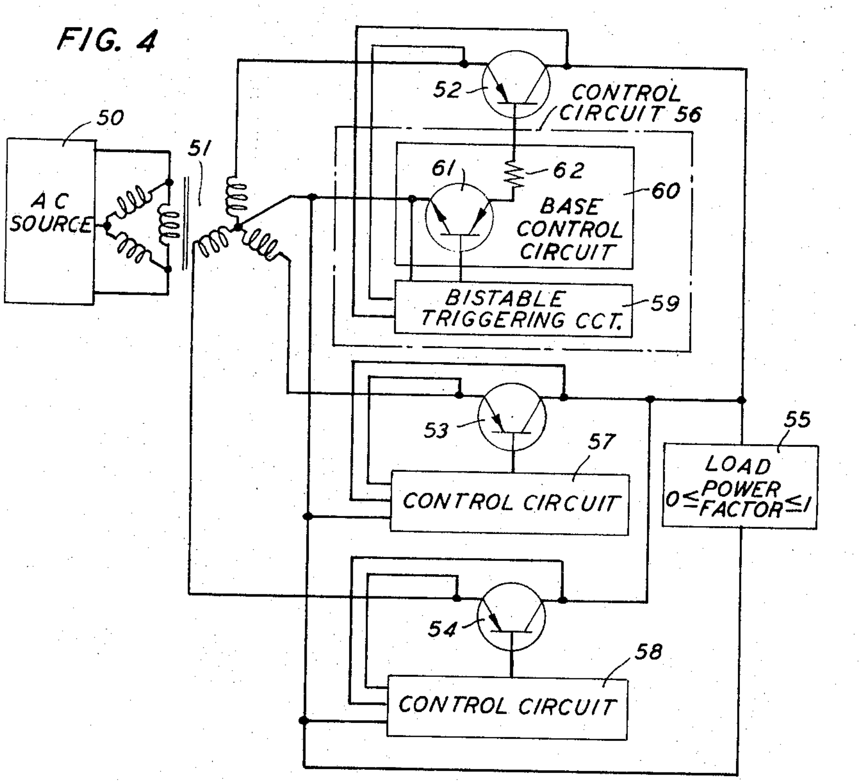
FIG. 4 is a simplified schematic of another embodiment of the invention using a three phase rectifier.

FIG. 4 is a simplified schematic of another embodiment of the invention using a three-phase, half-wave rectifier. Polyphase alternating current source 50 supplies energy via transformer 51 and through the emitter-collector paths of transistors 52, 53, and 54 to load 55. The secondary winding of transformer 51 is connected as a four-wire Y-system, one leg each being connected to the emitter electrode of a respective transistor, and having the neutral wire of the transformer connected to one terminal of the load. The collectors of transistors 52, 53, 54 are connected together to another terminal of the load to complete the power circuit. Control circuits 56, 57, and 58 have their respective inputs connected across the emitter-collector paths of transistors 52, 53, and 54, respectively, and their output is applied between the neutral wire of the transformer and the base electrode of a respective transistor. Control circuits 56, 57, and 58 control the conduction of the respective transistors. Each control circuit comprises a bistable triggering circuit 59 and base control circuit 60, which perform the identical functions as the corresponding bistable triggering circuit 17 and base control circuit 18 of the embodiment of FIG. 1.

In the present embodiment base control circuit 60 requires only a gate controlled bistable switch 61 and resistor 62, since an additional bias source is not necessary. The transformer voltage generated in a respective secondary winding, and directly applied through gate controlled bistable switch 61 and resistor 62 to the base-emitter junction of a respective transistor, is of the proper polarity and amplitude to saturate the respective transistor. Each transistor, therefore, conducts but during that portion of its operating cycle during which the source supplies power to the load, thereby preventing the absorption of power by the source from the load. Furthermore, since each transistor is switched into saturation during its respective conduction period, power losses in the rectifier transistors are minimized.

It is to be understood that the above-described arrangements are illustrative of the application of the principles of the invention. Numerous other arrangements may be devised by those skilled in the art without departing from the spirit and scope of the invention.

What is claimed is:

1. In a rectifier for supplying power from a source of alternating current to a load which may have a power factor other than unity, at least one switching transistor having its emitter-collector path connected from one side of said source to one side of said load to convert the alternating current from said source to direct current, a bistable trigger circuit connected to switch to a first state of equilibrium when the voltage across the emitter-collector path of said transistor rises above the first predetermined level and to switch to a second state of equilibrium when said voltage falls below a second predetermined level, and means to switch said transistor into its conducting state when said trigger circuit switches into said first state of equilibrium and to switch said transistor back into its nonconducting state when said trigger circuit switches into said second state of equilibrium, whereby the time said transistor is in its conducting state is limited to the portion of each operating cycle during which said source supplies power to said load.

2. A rectifier in accordance with claim 1 in which the emitter electrode of said transistor is connected to said source and the collector electrode of said transistor is connected to said load.

3. A rectifier in accordance with claim 1 in which said first predetermined voltage level is higher than said second predetermined voltage level.

4. A rectifier in accordance with claim 1 in which said transistor is switched back and forth between its conducting and nonconducting states by a control circuit which includes a source of direct voltage and a gate-controlled semiconductor switch connected in series across the emitter-base junction of said transistor, said source of direct voltage being poled to bias the emitter-base junction of said transistor in the forward direction, and which includes means to close said gate-controlled semiconductor switch when said trigger circuit switches into said first state of equilibrium and to open said gate-controlled semiconductor switch again when said trigger circuit switches into said second state of equilibrium.

5. A rectifier in accordance with claim 4 in which said trigger circuit has an input connected across the emitter-collector path of said transistor and an output connected across the gate control path of said gate-controlled switch.

References Cited

UNITED STATES PATENTS

| | | | |
|---|---|---|---|
| 2,693,568 | 11/1954 | Chase | 321—18 |
| 3,101,441 | 8/1963 | Curry | 323—22 |
| 3,207,973 | 9/1965 | Smith | 321—18 |
| 3,284,692 | 11/1966 | Gautherin | 323—22 |
| 3,305,764 | 2/1967 | Todd | 307—88.5 |

FOREIGN PATENTS 766,867 1/1957 Great Britain.

JOHN F. COUCH, *Primary Examiner.*

W. M. SHOOP, JR., *Assistant Examiner.*